Nov. 2, 1937.  E. F. GRETHER  2,097,457

NITROGENOUS FERTILIZER AND PROCESS OF MAKING SAME

Filed Aug. 15, 1935

| | Original Charge | | | | Conditions | | | Product | | | |
|---|---|---|---|---|---|---|---|---|---|---|---|
| Example Number | Weight of Peat Used (Gms) | % $H_2O$ in Peat | Nitrogenous Material Used | Weight of Nitrogenous Material (Gms) | Temperature (°C.) | Time of Heating (Hours) | Pressure (Lbs-Sq.In.) | % Total Nitrogen | % Water-Insoluble Nitrogen | Unleached | Leached |
| 1 | — | 50.0 | Ammonium Carbamate | Equal to Peat | 160° | 2 | 500 | 10.5 | 5.0 | Toxic | Non-Toxic |
| 2 | 20 | 0 | Urea and 100% Formaldehyde | 30.0 and 19.6 | 140° | 1 | 350 | 25.0 | 11.5 | Toxic | Non-Toxic |
| 3 | — | 0 | Saturated Solution Ammonium Sulphate | As much as would absorb | 300° | 2 | Atm. | 15.0 | 10.5 | Toxic | Non-Toxic |
| 4 | 60 | 0 | Urea | 40 | 220° and 200° | Rapid and 1/4 | Atm. | 14.34 | 11.26 | Toxic | Non-Toxic |
| 5 | 50 | 8.8 | Urea and 40 c.c. $H_2SO_4$ (conc.) | 25 | 225° and 300° | 2 and 1 | Atm. | 15.23 | 11.03 | Toxic | Non-Toxic |

Inventor

ERNEST F. GRETHER

By Semmes & Semmes
Attorneys

Patented Nov. 2, 1937

2,097,457

UNITED STATES PATENT OFFICE 2,097,457

NITROGENOUS FERTILIZER AND PROCESS OF MAKING SAME

Ernest F. Grether, Midland, Mich., assignor to The Dow Chemical Company, Midland, Mich., a corporation of Michigan Application August 15, 1935, Serial No. 36,435

9 Claims. (Cl. 71—24).

My invention relates to fertilizers, and more particularly to fertilizers which contain nitrogen.

An object of my invention is to produce a fertilizer having an insoluble nitrogen content, which is non-toxic to plant life, and which may be used in heavy dosages without injury to plants.

A further object of my invention is to produce a non-toxic fertilizer by a process which is simple and cheap to employ.

I have studied a wide variety of fertilizer materials rich in water insoluble nitrogen compound, and have found them in nearly all instances to contain small proportions of impurities which render the fertilizer material highly toxic to plant life. For instance, various nitrogenous fertilizers prepared by the heat treatment of urea; urea and peat mixtures; carbon-dioxide, ammonia and peat mixtures; ammonia and peat mixtures; ammonium salts and peat mixtures, etc. were all of the type referred to. Where I mention peat in the above I can in place thereof use other solid porous organic materials such as straw, sawdust, cellulosic wastes, and the solid waste residues from sugar refineries and distilleries, etc.

I have found that all such fertilizer materials can be washed free of the toxic impurities by water, and that they can, thereafter, be employed in quite high concentrations as a fertilizer without danger of injury to plant life. A fertilizer of this type which has been rendered non-toxic by the treatment just mentioned may be employed in dosages sufficient to furnish plant food for three or more growing seasons without danger of injury to plant life.

In the drawing:

The single figure of the drawing is a table showing data concerning some fertilizers which are of the type referred to, namely, having a high insoluble nitrogen content.

A fertilizer of the type referred to containing fixed nitrogen, a large proportion of which is in water-insoluble form, contains some toxic materials when made, the exact nature of which are not known. However, these toxic materials exhibit far greater toxicity toward plants than do urea, ammonium sulphate or other initial water-soluble nitrogenous fertilizer materials. The effect of these toxic ingredients on plants is harmful and though the plants will sometimes survive the use of such nitrogenous fertilizers and will later grow luxuriantly, yet even in such cases the plants are badly retarded and injured in their early stages.

Some of the fertilizers of this general nature retain their toxicity for a long period of time, and such are of but very small value as fertilizers unless properly treated in accordance with my method. Even where the injurious nature of the fertilizer disappears after a relatively short period of time, as above stated, the fertilizer is not entirely satisfactory.

I have found that these toxic substances can be removed from the fertilizer by washing the latter with water. This can be done with, or without, the application of heat. Warm water is somewhat more effective in certain instances than cold water, and in some cases boiling water may be employed without harming the fertilizer.

It is a peculiarity of the process that not all of the water soluble nitrogen compounds need be dissolved in this water treatment to remove the highly toxic and undesirable compounds which exist in the fertilizer. It is thought that these highly toxic materials are of very high solubility in water and are first removed without the necessity of dissolving all of the water soluble nitrogenous materials.

In most instances extraction of a fertilizer with from 1 to 3 times its weight of cold water effectively removes the toxic ingredients. Sometimes it is advisable to use a higher proportion of water.

The nitrogen compounds in the aqueous extract may be recovered in the form of ammonia, or in other suitable forms, and be used in preparing other fertilizer material.

In general I suspend the initial fertilizer material in water and wash the soluble toxic compounds out. This may be accompanied by agitation if desired.

As examples of some of the materials treated and to which this method is applicable, I will give the following:

*Example No. 1*

Equal weights of wet peat (50 percent $H_2O$) and ammonium carbamate were heated together in a steel bomb at 160° C. for two hours. The autogenous pressure was in the neighborhood of 500 pounds per square inch. A product was obtained containing 10.5 percent by weight of nitrogen. The water insoluble nitrogen was 5% of the weight of the product. This material when used on plants produced a toxic or burning effect. The material was leached with water and was found thereafter to produce no toxic effect on the plants.

Example No. 2

20 grams of dry peat were mixed with 30 grams of urea and 19.6 grams of 100 percent formaldehyde in the form of a 37% solution. The mixture was heated in a steel bomb at 140° C. for one hour. The autogenous pressure was in the neighborhood of 350 pounds per square inch. The product was then ground to pass through a 35 mesh screen. The total nitrogen in the product was 25 percent, the water insoluble nitrogen being 11.5 percent. This material produced a burning effect on young plants when added to the soil, but upon leaching with water was found to have lost its toxic properties.

Example No. 3

Oven dried peat was soaked in a saturated solution of ammonium sulphate at room temperature until the peat had absorbed its capacity. The excess solution was removed and the peat was heated at 300° C. for two hours at atmospheric pressure. The product had a total nitrogen content of 15 percent. The water insoluble nitrogen was 10.5 percent by weight of the product.

This material produced burning on young plants until leached with water, and thereafter tests showed that the toxic effect had disappeared and the material acted as a very good fertilizer.

Example No. 4

60 grams of oven dried peat and 40 grams of urea were mixed and heated rapidly in a small rotary dryer at atmospheric pressure to 220° C. and allowed to cool from this point. The stock temperature was above 200° C. for about 15 minutes. The weight of the product was 73 grams. The total nitrogen was 14.34 percent in the final product. The insoluble nitrogen in the product was 11.26 percent.

Here again the product was found to possess toxic properties to plant life, but when leached with water was found to have lost such toxic properties.

Example No. 5

40 cc. of concentrated sulfuric acid was mixed with 50 grams of wet peat (8.8% $H_2O$) and 25 grams of urea. This mixture was heated in a small rotary dryer at 225° C. and atmospheric pressure for two hours. The temperature was then raised to 300° C. and heating continued for one hour. The percentage of nitrogen in the final product was 15.23 percent. The water insoluble nitrogen was 11.03 percent.

Until washed, this material was toxic to plant life, but upon being washed with water, the toxic properties disappeared.

By the use of my process, at very small cost nitrogenous fertilizers which possess toxic properties can be rendered harmless, and the full benefit of the nitrogen content is available to plant life without danger of injury thereto. The nitrogen values leached from the fertilizer can be recovered from the aqueous extract. Fertilizers of the nature described are highly desirable since they permit of heavy dosage of fertilizer in the soil. Ordinarily fertilizers must be applied several times during a growing season in order to avoid burning or injury to the plants. With my fertilizer, by the leaching step I obtain a product which can be applied in such large quantities that the dosage will last for three or more growing seasons without danger of injury to plants.

I have given five examples of material of the type upon which I employ my process. It is to be understood that I can use my process on many other fertilizers having an insoluble nitrogen content and plant-toxic soluble constituents accompanying the desirable fertilizer values.

In the claims, the nitrogen compounds, e. g. ammonia, urea, ammonium salts such as ammonium sulphate, ammonium carbonate, ammonium carbamate, etc., which may be heated with peat or other porous organic solids to form nitrogenous fertilizers of the type herein treated are referred to as "ammonia and its derivatives".

I claim:

1. A process of treating a nitrogenous fertilizer, prepared by heating a compound selected from the class consisting of ammonia and its derivatives with a solid porous organic material, said fertilizer containing its nitrogen largely but not completely in water-insoluble form and also containing a plant-toxic material, which comprises washing the fertilizer with sufficient water effectively to remove the plant-toxic material without completely removing the water-soluble nitrogen compounds contained in the fertilizer.

2. A process of manufacturing a fertilizer comprising subjecting a porous organic waste material in the presence of urea forming substances to a heat treatment at elevated pressures whereby insoluble nitrogen containing compounds are formed in situ, subjecting such material in a further step to leaching with water to remove plant toxic material therefrom without completely removing water-soluble nitrogen compounds contained in the fertilizer.

3. A process of preparing a fertilizer comprising subjecting a porous organic material to the action of urea forming materials and an agent which promotes the formation of insoluble nitrogen compounds under the action of heat and pressure, then washing the product with water to remove plant toxic material therefrom without completely removing water soluble nitrogen compounds contained in the fertilizer.

4. A process of making fertilizer comprising subjecting porous organic material to the action of ammonium sulphate at elevated temperatures and substantially atmospheric pressure, then treating the product with sufficient water to remove plant toxic material without completely removing the water-soluble nitrogen compounds contained in the fertilizer.

5. A process of making a fertilizer comprising treating porous organic material with urea at elevated temperatures and approximately atmospheric pressure, and then leaching water soluble toxic substances from the product by treatment with water in amount insufficient to remove completely the water-soluble nitrogen compounds contained in the fertilizer.

6. A fertilizer material prepared by heating urea with a solid porous organic material to a temperature at which the urea is substantially decomposed with formation of water-insoluble nitrogen compounds and thereafter washing the product with sufficient water to remove plant-toxic materials therefrom without completely removing the water-soluble nitrogen compounds contained in the fertilizer.

7. A fertilizer material prepared by heating a solid porous organic material with an ammonium salt of a strong acid to a temperature at which said salt is largely decomposed with formation of water-insoluble nitrogen compounds and thereafter washing the product with sufficient water to remove impurities therefrom which are toxic to plant life without completely removing the water-soluble nitrogen compounds contained in the fertilizer.

8. A fertilizer material prepared by heating a solid porous organic material with ammonium sulphate to a temperature at which the ammonium sulphate is largely decomposed with formation of water-insoluble nitrogen compounds and thereafter washing the product with sufficient water to remove therefrom impurities which are toxic to plant life without completely removing the water-soluble nitrogen compounds contained in the fertilizer.

9. A nitrogenous fertilizer prepared by heating a compound selected from the class consisting of ammonia and its derivatives with a solid porous organic material to form a fertilizer containing its nitrogen largely, but not completely, in water-insoluble form and also containing a plant-toxic material, and thereafter washing the fertilizer with sufficient water effectively to remove the plant-toxic material without completely removing the water-soluble nitrogen compounds contained in the fertilizer.

ERNEST F. GRETHER.